May 5, 1953     H. E. CHURCHILL     2,637,420
SPLIT FLEXIBLE BRAKE BAND
Filed Nov. 12, 1949

INVENTOR.
Harold E. Churchill
BY Brown, Jackson, Boettcher & Dienner
ATTORNEYS.

Patented May 5, 1953

2,637,420

UNITED STATES PATENT OFFICE

2,637,420

SPLIT FLEXIBLE BRAKE BAND

Harold E. Churchill, South Bend, Ind., assignor to The Studebaker Corporation, South Bend, Ind., a corporation of Delaware Application November 12, 1949, Serial No. 126,827

2 Claims. (Cl. 188—259)

My invention is primarily directed to a new and useful brake band construction of the type used in automotive transmissions or the like.

More particularly, my invention is concerned with a new type of bifurcated brake band construction capable of greater braking efficiency than the conventional single strap type of brake band presently employed.

It is a common practice in the automotive and allied industries to employ a single strap type circular brake band in transmisisons or the like for providing braking action in a planetary gear system, as, for example, during the reversing action of the transmission. In any event, in forming a fairly wide, single strap, brake band into an annular ring for gripping a brake drum, cylinder, shaft or the like, it has been found that considerable camber or transverse curvature of the band is developed unless great care and expensive machinery are employed. The presence of camber causes a decrease in the effective contact area of a conventional brake band liner in that with camber present contact with the braking drum is established normally along a single path or area located centrally of the brake lining material instead of across the entire width of the brake liner as is desired.

I have overcome this objectionable feature by providing a brake band in which the internal stresses of the conventional rolled brake band causing the camber or the transverse curvature of the band has been relieved thereby to increase the effective braking area of the brake lining.

Briefly, my invention comprises a conventional, circular, strap type brake band having a brake lining mounted along its internal cylindrical surface and provided with a centrally disposed slotted opening running substantially along the circumferential length of the band to relieve the camber formed therein.

It is the primary object of my invention to provide a bifurcated brake band substantially free of camber thereby to insure a more positive braking surface.

It is a further object of my invention to provide a bifurcated brake band comprising a pair of relatively, narrow, spaced apart brake bands commonly joined at their ends to common anchorage members adapted to receive compressive braking force from a hydraulic actuator or the like.

It is a still further object of my invention to provide a new type of brake band capable of smoother braking action.

These and further objects will appear from time to time as the following specification proceeds. Now in order to acquaint those skilled in the art with the mode of constructing and utilizing my invention, particular reference is made to the accompanying drawing in which I have shown a preferred embodiment of my invention.

Figure 1:
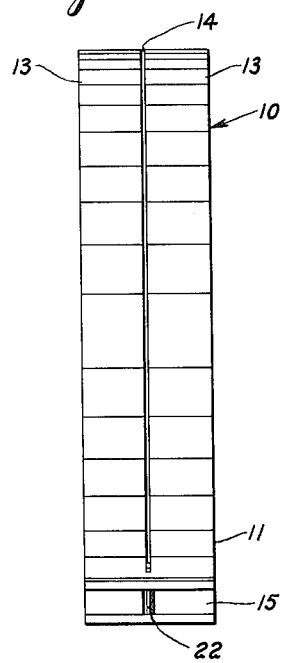
Figure 1 is a front elevational view of a brake band constructed in accordance with my invention, displaying the camber relieving slotted opening therein.
Figure 2:
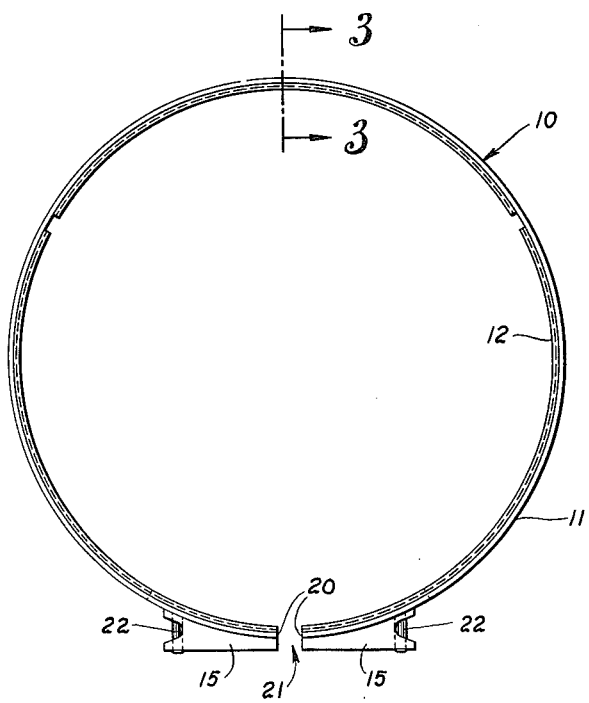
Figure 2 is a side elevation of the band shown in Figure 1.

Referring now to Figures 1 and 2 of the drawings, a brake indicated generally at 10 therein comprises a single annular metal band 11 provided with internally mounted lining material 12, and bifurcated into two spaced narrow bands 13 separated by a single slotted opening 14 running lengthwise of the band 11, the narrow bands being interconnected at their ends and joined to anchor members 15 common to both bands.

The single strap metal band 11 may be of the conventional type having greater width than thickness. In forming such a band, a length or blank of strap metal, such as steel or the like, is usually formed into an annular ring by successive cold rolling operations in a suitable bending machine or the like, such being a cheap and expedient forming method. In performing the forming operation, however, the metal has a tendency to develop a transverse curvature across its width thus creating a spherical rather than a cylindrical inner surface. This spherical curved effect is referred to herein and in the industry as camber and presents a convex braking surface to a conventional brake drum's cylindrical surface.

In mounting lining material 12 to the inside of the band 11, as is done in the normal brake band, the camber of the band causes the lining, which conforms itself to the transverse curvature thereof, to have braking contact along the central area of its braking surface only, the camber being in convex sense to the brake drum. Such an effect decreases the braking efficiency of the lining material to a considerable extent. To roll a metal band, as described above, having a true cylindrical inner surface free of camber, takes expensive machinery, considerable skill and time; making the operation commercially prohibitive. I have substantially overcome the deleterious effects of camber in the single type brake band by splitting the conventional single strap type brake band into narrower bands 13.

The bands 13 may be formed from the single band 11 by milling or otherwise cutting the slotted opening 14 substantially along the length and in central disposition thereof. Preferably the opening 14 should be formed in band 11 after the lining material 12 has been securely cemented or otherwise secured to the inner surface thereof. For this purpose cement should be placed along the inner surface of the band 11, making sure the cement is of approximately uniform thickness and the lining material then pressed thereon under heat and pressure.

Figure 3:
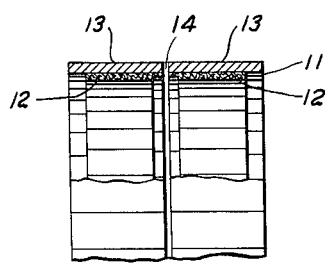
Figure 3 is a detailed enlarged partial cross sectional view taken substantially along line 3—3 of Figure 3.

The band 11 with attached lining material 12 may then be placed on a drum having a diametric dimension at least equal to that which the inner lining assumes under compressive resilient braking action of the band 11. The opening 14 is then formed substantially along the circumferential length of the band 11 by a milling cutter or the like, the cut reaching through the lining as will be seen in Figure 3. It should be noted that the opening 14 stops short of the adjacent ends 20 of the band 11 to provide thereby a common end connection between the narrower bands 13. It should be further noted that the band 11 is not formed as a closed circular ring, but left open at 21 between the adjacent ends 20 thereof to provide space for resilient compression of the band 11 to a smaller internal diameter during braking action when braking pressure is applied against the conventional anchor members 15 mounted at the ends of the two narrow bands 13.

The anchor members 15 are herein shown in Figures 1 and 2 as metal blocks having a curved upper portion adapted to fit the outside curvature of the band 11 and securely fastened thereto in a suitable manner, as by welding. Cylindrical pins 22 are pressed into suitable openings in the band 11 for locating the anchor members 15 in proper position thereon, and for connecting the anchor members with conventional brake actuating mechanism, such as a hydraulic actuator or piston, not shown.

Use and operation

Figure 4:
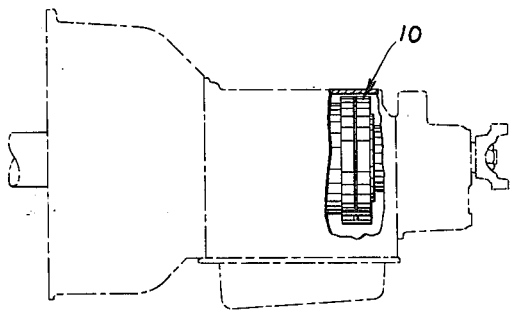
Figure 4 is a partially broken away view of a transmission outlined in phantom, showing a brake band of my construction in typical operating position therein.

In utilizing a brake band of the class and type I have described above, more efficient and positive braking action is gained. A typical installation to which my brake band is readily adapted may be seen in Figure 4, wherein the band is actuated hydraulically to hold a planetary member in an automotive transmission; the particular use as illustrated therein being to brake a planetary member during reversing of the transmission.

It has been established in such an installation that my split brake band construction has more than a 20% increase in rupture temperature or failure threshold over the conventional type of single strap band. This means, for a given braking load at a given inclination of the vehicle, that the split band construction I employ will effectively operate at temperatures 20% or more greater than will the conventional single strap band before failure of the lining and brake occur; the braking pressure applied to both styles of the bands being equal under such a test. It also has been established that in forming a $1\frac{5}{16}$" strap of No. 16 (.0598 inch) (U. S. S.) gage cold rolled and oiled steel, having a high tensile strength with a minimum yield of 50,000 p. s. i., minimum ultimate tensile strength of 70,000 p. s. i., and Rockwell hardness scale B, 78 to 81; into a 6.290" diameter brake band, a camber or transverse curvature of the strap will occur of from .007" to .020". After the slotting operation is performed in the conventional single strap band to form the opening 14 therein, the camber is reduced within the limits of from .005 to .015". This reduction of camber is naturally advantageous in that the brake lining material will have at least two braking surfaces contacting the brake drum or the like, whereas under the old single strap style of brake band the lining contacted the brake drum along its central area only. Additionally, having the narrower bands 15 commonly connected at the ends provides for equal braking pressure therebetween, resulting in a uniform positive braking action characterized by an absence of the normal grabbing action of the conventional single strap type band heretofore used for the purposes illustrated above.

Thus it may be seen that I have provided a new and useful type of brake band construction capable of longer life and greater braking efficiency, and simple and inexpensive to construct.

While I have herein shown one form in which my invention may appear, it will be readily understood that the use of equivalents, substitution of materials, numerous changes and modifications may occur without departing from the spirit and scope hereof, and, therefore, I do not wish to be limited to the specific embodiment herein illustrated, except as may appear in the following appended claims.

I claim:

1. A bifurcated brake band comprising a single metal strap formed as an open annular ring, the opposing ends of said band being spaced apart along the circumferential periphery thereof to allow for resilient closure of said band during braking movement thereof, lining material disposed along the inner surface of said band and rigidly secured thereto, said annular construction comprising said metal band and attached lining having a centrally disposed slotted opening formed therethrough reaching substantially around the circumferential length of said band and lining thereby dividing said band and lining into a pair of similar narrow bands adapted to be uniformly and simultaneously expanded and contracted to provide braking action thereof, and common connective means disposed between the several opposed ends of said narrow bands comprising the remaining end portions of said single band not separated by said annular slotted opening.

2. In an annular bifurcated brake band for gripping the external surface of a brake drum or the like for the braking arrestation thereof, a single metal strap formed as an open annular ring, the opposing ends of said strap being spaced apart to provide for resilient closure of said band during braking action thereof, lining material disposed substantially coextensively over the internal surface of said strap and rigidly secured thereto, said strap and lining being bifurcated into two similar, side-by-side, narrow bands by means of a slotted opening disposed centrally of said strap and lining, formed through both said strap and lining, extending substantially along the circumferential length thereof and terminating adjacent but prior to said opposed ends of said strap, a pair of connective means, each commonly and integrally interjoining similar ends of said two bands and comprising the end portions of said strap and lining which are undivided by said slotted aperture, and an anchor member mounted on each of said connective means, radially outward thereof, for transmitting external braking force thereto whereby said two bands will contract uniformly and simultaneously during braking actuation of said brake band.

HAROLD E. CHURCHILL.

References Cited in the file of this patent

UNITED STATES PATENTS

| Number | Name | Date |
|---|---|---|
| 774,448 | Norris | Nov. 8, 1904 |
| 1,405,601 | Libby | Feb. 7, 1922 |
| 1,464,691 | Bayley | Aug. 14, 1923 |
| 1,568,043 | Anderson | Jan. 5, 1926 |
| 1,751,648 | Nieman | Mar. 25, 1930 |
| 1,966,750 | Boughton | July 17, 1934 |
| 2,012,025 | Sawtelle | Aug. 20, 1935 |
| 2,088,782 | Ford | Aug. 3, 1937 |
| 2,195,262 | Rasmussen | Mar. 26, 1940 |
| 2,354,389 | Lidkea | July 25, 1944 |
| 2,438,483 | Tack | Mar. 23, 1948 |